(12) United States Patent
Reem et al.

(10) Patent No.: US 6,715,869 B1
(45) Date of Patent: Apr. 6, 2004

(54) INK SET FOR INK JET PRINTING (75) Inventors: Richard C. Reem, Hilton, NY (US); Karen J. Klingman, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/299,405

(22) Filed: Nov. 19, 2002

(51) Int. Cl.$^7$ .................................................. B41J 2/01
(52) U.S. Cl. .................... 347/100; 347/101; 106/31.13; 106/31.6
(58) Field of Search ................................ 347/100, 101, 347/96, 95, 105; 106/31.13, 31.6; 428/195

(56) References Cited

U.S. PATENT DOCUMENTS

| | | | |
|---|---|---|---|
| 5,925,178 A | | 7/1999 | Martin et al. |
| 6,161,929 A | * | 12/2000 | Erdtmann et al. .......... 347/101 |
| 6,497,480 B1 | | 12/2002 | Wexler |
| 6,605,338 B1 | * | 8/2003 | Romanic et al. ............ 428/195 |

FOREIGN PATENT DOCUMENTS

| | | |
|---|---|---|
| EP | 1 048 466 A2 | 11/2000 |
| EP | 1 057 646 A2 | 12/2000 |
| EP | 1 108 760 A1 | 6/2001 |

OTHER PUBLICATIONS

Han–Adebekun et al, A Method of Selecting Ink Jet Inks in a Color Set, USSN 10/034,285, filed Dec. 28, 2001.
Han–Adebekun et al, A Method of Selecting Ink Jet Inks and Receiver in a Color Set and Receiver Combination, USSN 10/032,931, filed Dec. 28, 2001.
Chen et al, Materials for Reducinging Inter–Color Gloss Difference, USSN 10/034,281, filed Dec. 28, 2001.

* cited by examiner

Primary Examiner—Russell Adams
Assistant Examiner—Manish Shah

(57) ABSTRACT

A pigment-based ink set for ink jet printing is described, wherein each ink in the ink set has a normalized differential specular reflectance, $N\Delta R_S(X)$, of less than 1.25. $N\Delta R_S(X)$ is defined as the maximum value within a set of $N\Delta R_S(Xn)$ values in which each $N\Delta R_S(Xn)$ is the normalized specular reflectance for a density patch of a printed test image. The printed test image consists of a series of at least ten density patches printed such that the ink laydown of the patches increases incrementally, from no ink laydown to a maximum level generating a density of at least about 1.5; and wherein $N\Delta R_S(Xn)$ for each patch is determined according to:

$$N\Delta R_S(Xn) = \frac{[R_{Smax}(Xn) - R_{Smin}(Xn)]}{R_{Smean}(Xn)}$$

where, over the visible spectral region between 390 nm and 720 nm for patch Xn, $R_{Smax}(Xn)$ is the maximum, $R_{Smin}(Xn)$ is the minimum, and $R_{Smean}(Xn)$ is the average specular reflectance.

30 Claims, 1 Drawing Sheet

INK SET FOR INK JET PRINTING

CROSS REFERENCE TO RELATED APPLICATIONS

Reference is made to commonly assigned, co-pending application Ser. No. 10/299,385 by Reem and Klingman filed of even date herewith entitled "Ink Composition for Ink Jet Printing"; and application Ser. No. 10/299,385 by Reem and Klingman, filed of even date herewith entitled "Combination Ink Set/Image-Recording Element for Ink Jet Printing." These copending applications are incorporated by reference herein for all that they contain.

FIELD OF THE INVENTION

This invention relates to a pigment-based ink set for ink jet printing that exhibits minimal, if any, chromatic gloss when printed on an image-recording element.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired printed image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired printed image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either pigment-based or dye-based. A pigment is a colorant that is insoluble in the carrier medium, but is dispersed or suspended in the form of small particles, often stabilized against flocculation and settling by the use of dispersing agents. A dye is a colorant that is dissolved in the carrier medium. In either case, the carrier medium can be a liquid or a solid at room temperature. Commonly used carrier media are aqueous-based and include water, water miscible humectants and water miscible organic co-solvents.

Pigment-based inks are often preferred over dye-based inks because they render printed images having higher optical densities and better resistance to light and ozone as compared to printed images made with dye-based inks. However, pigment-based inks have their own set of deficiencies that tends to arise from the propensity of the pigment particles to accumulate at the surface of the image-recording element. For example, the pigment particles may exhibit poor rub resistance or cause variations in gloss between imaged areas of different colors in a printed image. Solutions to these problems have been discussed extensively in the patent literature, see for example U.S. Pat. Nos. 6,161,929 and 5,925,178; Eur. Pat. Appl. No. EP 1 108 760 A1; and U.S. patent application Ser. Nos. 10/032,931; 10/033,229; 10/034,281 and 10/034,285 filed on Dec. 28, 2001, the disclosures of which are incorporated herein by reference.

Another deficiency with pigment-based inks is that they may give rise to chromatic gloss in certain imaged areas in a printed image. Chromatic gloss is an artifact that appears as a colored sheen or gloss from the surface of a printed image as the view and/or illumination angle changes relative to the surface of the printed image. In printed images prepared using ink jet inks and image-recording elements, chromatic gloss typically appears as a pink sheen in cyan-colored imaged areas, a yellow-orange sheen in magenta-colored imaged areas and a blue sheen in yellow-colored imaged areas. Chromatic gloss is especially problematic when pigment-based inks are printed on glossy image-recording elements. Although chromatic gloss has been observed for commercially available pigment-based ink sets printed on image-recording elements as will be shown herein, no discussion or acknowledgment of chromatic gloss in ink jet printing has been found in the literature.

Another, similar artifact called bronzing has been described in the field of graphic arts printing, and is sometimes visible for ink jet printed images as well. Although bronzing can appear in samples from the same printer system as chromatic gloss, bronzing appears as a metallic, bronze-colored sheen and is different from chromatic gloss. This invention pertains to chromatic gloss.

Although not designed to minimize chromatic gloss, one possible solution to this problem is to laminate the entire printed image with a protective layer. Another possible solution is to print on an image-recording element having a fusible top layer into which the ink components can penetrate, and then fuse the top layer to generate a smooth glossy surface. Examples of such technology are disclosed in U.S. patent application Ser. No. 09/954,779, filed on Sep. 18, 2001 of Wexler, or coating a protective layer on the imaged areas as described in EP 1 057 646 A1 and EP 1 048 466 A1. However, all these approaches involve separate steps after printing, making the entire process complex and costly.

For the production of high quality photorealistic images via ink jet printing, pigment-based ink sets must provide printed images that are free from objectionable chromatic gloss. It is an object of this invention to provide a pigment-based ink set for ink jet printing that, when printed on an image-recording element, minimizes chromatic gloss to an acceptable level without requiring a separate step after printing.

SUMMARY OF THE INVENTION

The present invention overcomes the problems discussed above by providing a pigment-based ink set for ink jet printing, the ink set comprising at least one pigment-based ink, wherein the normalized differential specular reflectance for each ink in the set, $N\Delta R_S(X)$, is less than 1.25 when calculated according to Equation 1:

$$N\Delta R_S(X) = [N\Delta R_S(Xn)]_{max} \qquad \text{Equation 1}$$

where X represents the ink, n is an integer associated with each density patch printed on an image-recording element as part of a test image, and $[N\Delta R_S(Xn)]_{max}$ is the maximum value of the $[N\Delta R_S(Xn)]$ values that are calculated for the density patches printed using ink X; wherein the image-recording element has a gloss value of at least about 5 when measured at 60°; wherein the test image for ink X consists of a series of at least ten density patches printed such that the ink laydown of the patches increases incrementally, from no ink laydown to a maximum level generating a density of at least about 1.5; and wherein the normalized differential specular reflectance value for each patch, $N\Delta R_S(Xn)$, is determined according to Equation 2:

$$N\Delta R_S(Xn) = \frac{[R_{Smax}(Xn) - R_{Smin}(Xn)]}{R_{Smean}(Xn)} \quad \text{Equation 2}$$

where $R_{Smax}(Xn)$ is the maximum specular reflectance over the visible spectral region between 390 nm and 720 nm for patch Xn, $R_{Smin}(Xn)$ is the minimum specular reflectance over the visible spectral region between 390 nm and 720 nm for patch Xn, and $R_{Smean}(Xn)$ is the average specular reflectance over the visible spectral region between 390 nm and 720 nm for patch Xn.

As used herein, the term "ink set" describes all the ink jet inks used in a printer to produce an image. The set can include inks of many colors; inks of many colors with different densities or hues; inks of one color only; or inks of one color with different densities or hues. The term means at least one ink, usually more than one ink, used to produce a color or a black and white image.

BRIEF DESCRIPTION OF THE DRAWINGS

While the specification concludes with claims particularly pointing out and distinctly claiming the subject matter of the present invention, it is believed the invention will be better understood from the following detailed description when taken in conjunction with the accompanying drawings wherein:

DETAILED DESCRIPTION OF THE INVENTION

Spectral Reflectance Properties

It is well known in the art of color measurement that the color appearance of an opaque object is in part due to the behavior of light that is reflected from the object. (For a complete description of color measurement refer to "Measuring Color", $2^{nd}$ Edition by R. W. G. Hunt, published by Ellis Horwood Ltd., 1991.) Reflectance is evaluated in terms of diffuse reflectance and specular reflectance. (For a complete description of reflectance spectroscopy refer to "Chemical Analysis", Volume 21, by W. W. Wendlandt and H. G. Hecht, published by Interscience Publishers, 1966, Chapters 2 and 3.) Most of the radiation from the light source enters the object and is partially absorbed or scattered as the material interacts with the light. One observes the resultant fraction of the light that either passes through the object (transmittance) or scatters back from the object (diffuse reflectance). Specular reflection occurs when a fraction of the incident light never penetrates the object, but rather interacts with and scatters off the interface between the first medium, usually air, and the object. Diffuse reflectance is typically dispersed equally in all directions (referred to as lambertian reflectance) when emerging from the observed object, while specular reflectance can be highly directional, depending on the roughness of the surface.

Figure 1:
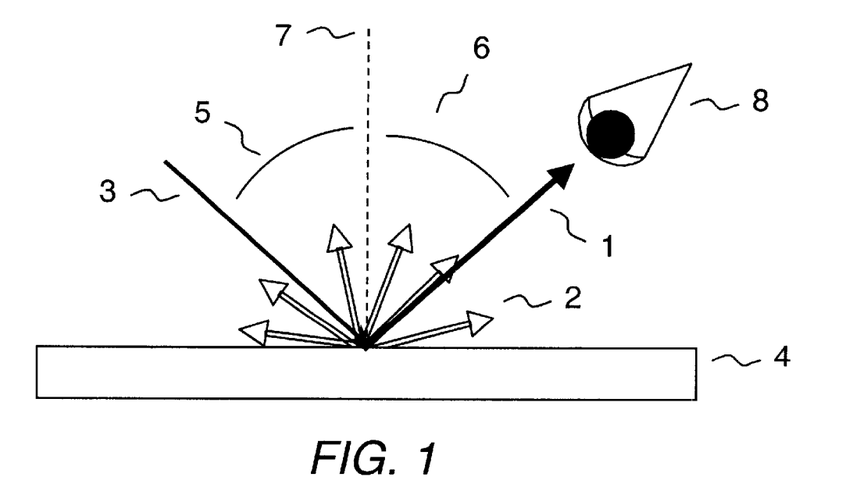
FIG. 1 shows light reflecting off the surface of a glossy image-recording element.

As shown in FIG. 1, specular reflectance 1 and diffuse reflectance 2 occur when incident light 3 strikes the surface of a glossy image-recording element 4. The angle of incidence ($\Theta_i$) 5 is the angle at which light strikes the image-recording element, and the complement angle is the angle of reflectance ($\Theta_r$) 6, where $\Theta_r = -\Theta_i$. Both $\Theta_i$ and $\Theta_r$ are defined relative to the normal 7 to the average plane of the image-recording element. Element 8 represents an observer or a detector. Gloss is the light reflected back from an object at $\Theta_r$ and is dominantly specular reflectance. Diffuse reflectance is reflected back at all angles.

Figure 2:
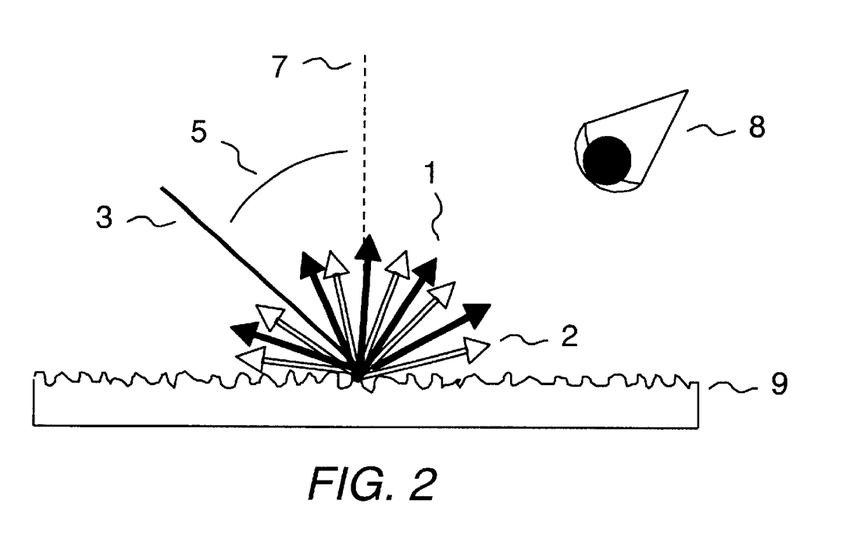
FIG. 2 shows light reflecting off the surface of a matte image-recording element.

As shown in FIG. 2, specular reflectance 1 and diffuse reflectance 2 occur when incident light 3 strikes the surface of a matte image-recording element 9. Both specular and diffuse reflectance occur at all angles, such that little or no gloss is observed.

Ink jet image-recording elements are available in a variety of finishes such as matte, satin, semi-glossy and glossy. The finish that one observes is directly dependent upon the amount of diffuse and specular reflectance that occurs when light interacts with the image-recording element. The amount of specular reflectance is in turn dependent upon the surface of the image-recording element. If the surface of an image-recording element is rough, light reflects from the surface in all directions, and the image-recording element will have a matte appearance. In contrast, if the surface of an image-recording element is smooth, light reflects from the surface in primarily one direction, and the image-recording element will have a glossy appearance.

Glossy image-recording elements may have gloss values ranging from 5 to about 90 when measured at 60°. Examples of glossy image-recording elements are Kodak Instant-Dry Photographic Glossy Media having Cat. No. 8103137 (60° gloss of about 64), Epson Photoglossy Paper having Cat. No. SP91001 (60° gloss of about 34), and Kodak Instant-Dry Photographic Satin Media having Cat. No. 8648263 (60° gloss of about 30). Many examples of matte, satin, semi-glossy and glossy image-recording elements to be used for ink jet printing have been described in the patent literature, see for example, U.S. Pat. Nos. 6,045,917; 5,605,750; 5,723,211; 5,789,070 and EP 813 978 A1.

When ink jet inks are printed on ink jet image-recording elements, components of the ink may reside at the surface of the printed image even after the printed image is completely dry. If the components at the surface are colorants, then the amount of specular reflectance is dependent on the colorant. Because colorants absorb light in the visible spectral region, the specular reflectance varies as a function of wavelength and appears as chromatic gloss.

The problem of chromatic gloss is significant for printed images in which pigment-based inks have been printed on glossy image-recording elements. Pigment colorants may be up to about 0.5 $\mu$m in diameter; this is much bigger than the pores created at the surface of a smooth glossy porous image-recording element. In such cases, pigment colorants cannot be pulled into the pores of the image-recording element via capillary action and remain trapped at the surface of the image-recording element. Pigment colorants are typically too large to diffuse into swellable nonporous media. In both cases, chromatic gloss is commonly observed.

The present invention discloses that a particular spectral reflectance property for each ink in a given ink set can be used to determine the extent to which chromatic gloss will be observed for the ink set printed on an image-recording element. The ink set comprises at least one ink. For example, the ink set may consist of one ink such as a cyan ink; three inks such as cyan, magenta and yellow inks; or four inks such as cyan, magenta, yellow and black inks, as is well known in the art of ink jet printing. Other examples include ink sets consisting of six, seven, eight or even more inks. The spectral reflectance property is the normalized differential specular reflectance of the ink, $N\Delta R_S(X)$:

$$N\Delta R_S(X) = [N\Delta R_S(Xn)]_{max} \quad \text{Equation 1}$$

where X represents the ink, n is an integer associated with each density patch printed as part of a test image, and $[N\Delta R_S(Xn)]_{max}$ is the maximum value of the normalized differential specular reflectances that are calculated for the density patches printed using ink X.

The test image for ink X consists of a series of at least ten density patches printed such that the ink laydown of the patches increases incrementally, from no ink laydown to a maximum level generating a density of at least about 1.5. The test image is printed on an image-recording element having a gloss value of at least about 5 when measured at 60°. The normalized differential specular reflectance value for each patch, $N\Delta R_S(Xn)$, is determined according to:

$$N\Delta R_S(Xn) = \frac{[R_{Smax}(Xn) - R_{Smin}(Xn)]}{R_{Smean}(Xn)} \quad \text{Equation 2}$$

where $R_{Smax}(Xn)$ is the maximum specular reflectance over the visible spectral region between 390 nm and 720 nm for patch Xn, $R_{Smin}(Xn)$ is the minimum specular reflectance over the visible spectral region between 390 nm and 720 nm for patch Xn, and $R_{Smean}(Xn)$ is the average specular reflectance over the visible spectral region between 390 nm and 720 nm for patch Xn.

$N\Delta R_S(Xn)$ is determined by illuminating a density patch at $\Theta_i=45°$ as the angle of incidence 5, and measuring the reflected light intensity using a spectroradiometer oriented at $\Theta_r=-45°$ as the angle of reflectance 6. The result is referenced to the reflectance of a calibrated (NIST) piece of polished black glass measured using $\Theta_i=-45°$ and $\Theta_r=-45°$. $R_{Smax}(Xn)$, $R_{Smin}(Xn)$ and $R_{Smean}(Xn)$ are determined and used to calculate $N\Delta R_S(Xn)$ for each patch according to Equation 2. The resulting $N\Delta R_S(Xn)$ values are used to calculate $N\Delta R_S(X)$ according to Equation 1. A pigment-based ink set will give rise to objectionable chromatic gloss if any one of the inks in the ink set has $N\Delta R_S(X)$ greater than 1.25.

Pigment-Based Inks

The process of preparing inks from pigments commonly involves two steps: (a) a dispersing or milling step to break up the pigment into primary particles, and (b) a dilution step in which the dispersed pigment concentrate from step (a) is diluted with a carrier and other addenda to a working strength ink. In the milling step, the pigment is usually suspended in a carrier (typically the same carrier as that in the finished ink) along with rigid, inert milling media. Mechanical energy is supplied to this pigment concentrate, and the collisions between the milling media and the pigment cause the pigment to deaggregate into its primary particles. A dispersant or stabilizer, or both, may be added to the dispersed pigment concentrate to facilitate deaggregation, maintain particle stability, and retard particle reagglomeration and settling.

There are many different types of materials that may be used as milling media, such as glasses, ceramics, metals, and plastics. In a preferred embodiment, the milling media can comprise particles, preferably substantially spherical in shape, e.g., beads, consisting essentially of a polymeric resin. In general, polymeric resins suitable for use as milling media are chemically and physically inert, substantially free of metals, solvent and monomers, and of sufficient hardness and firability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly(tetrafluoroethylenes), e.g., Teflon®, and other fluoropolymers, high density polyethylenes, polypropylenes, cellulose ethers and esters such as cellulose acetate, poly(hydroxyethylmethacrylate), poly(hydroxyethylacrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly(phosphazenes). The polymeric resin can have a density from 0.9 to 3.0 g/cm³. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an air jet mill, a roller mill, a ball mill, an attritor mill and a bead mill. A high-speed, high-energy mill is preferred by which the milling media obtain velocities greater than about 5 meters per second. In the present invention, a sawtooth impeller having a diameter of 40 mm when operated at 9,000 rpm (available from Morehouse-Cowles Hockmeyer) is used. The preferred proportion of milling media, pigment, carrier and optional dispersant can vary within wide limits and depends, for example, upon the particular pigment, the size and density of the milling media, and the particular printing application. For pigment-based inks of the invention, the pigment is present in the dispersed pigment concentrate at 1 to 50 wt. %, and the weight ratio of pigment to dispersant is 20:1 to 1:2. After milling is complete, the dispersed pigment concentrate is separated from the milling media by simple sieving or filtration.

The dispersant is an optional ingredient used to prepare the dispersed pigment concentrate. Preferred dispersants used in the present invention include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersants to select from. The dispersant used in the examples is potassium N-methyl-N-oleoyl taurate. Dispersants may not be necessary if the pigment particles themselves are stable against flocculation and settling. Self-dispersing pigments are an example of pigments that do not require a dispersant; these types of pigments are well known in the art of ink jet printing.

The milling time can vary widely and depends upon the pigment, milling means and residence conditions selected, the initial and desired final particle size, etc. In the present invention, milling times typically range from 1 to 100 hours.

The pigment particles useful in the invention may have any particle size that can be jetted through an ink jet printhead. The pigment particles may have a mean particle size of up to 0.5 $\mu$m. Preferably, the pigment particles have a mean particle size of less than about 0.3 $\mu$m, more preferably less than about 0.15 $\mu$m.

A wide variety of organic and inorganic pigments, alone or in combination, may be selected for use in the inks of the present invention. Pigments that may be used in the invention include those disclosed in, for example, U.S. Pat. Nos. 5,026,427; 5,086,698; 5,141,556; 5,160,370; and 5,169,436, the disclosures of which are incorporated herein by reference. The exact choice of pigments will depend upon the specific application and performance requirements such as color reproduction and image stability.

Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; and C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66. In a preferred embodiment of the invention, the pigment is C.I. Pigment Blue 15:3, C.I. Pigment Red 122, C.I. Pigment Yellow 155, C.I. Pigment Yellow 74 or a bis(phthalocyanylalumino) tetraphenyldisiloxane as described in U.S. Pat. No. 4,311,775, the disclosure of which is incorporated herein by reference.

The pigment used in the inks of the invention is present in any effective amount, generally from about 0.1 to about 10 wt. %, and preferably from about 0.5 to about 6 wt. %.

Polymers may be used in the inks of the present invention. Useful polymers include those described in U.S. patent application Ser. No. 10,299,385 of Reem and Klingman and filed of even date herewith, the disclosure of which is incorporated herein by reference. Any homopolymer or copolymer can be used in the present invention provided it can be stabilized in an aqueous medium, particularly an aqueous basic medium, and is generally classified as either water soluble, water reducible, or water dispersible.

Polymers useful in the inks of the invention include those referred to as addition polymers, which are prepared by free radical polymerization of vinyl or ethylenically unsaturated monomers. In a preferred embodiment, the addition polymer is derived from acrylic and/or styrenic monomers which are well known in the art of polymer chemistry. The term "acrylic monomer" as employed herein includes, but is not limited to, any derivative of an acrylic acid, acrylate ester, acrylamide, or unsaturated anhydride or unsaturated imide monomer which may be completely or partially hydrolyzed after polymerization to form the corresponding carboxylic acid or amide functionality. The term "styrenic monomer" as employed herein includes, but is not limited to, any derivative of a styrene, α-alkylstyrene, trans-β-alkylstyrene, alkylstyrene, alkoxystyrene, halogenated styrene, or vinyl naphthalene.

Specific examples of preferred addition polymers include commercially available polymers such as Joncryl® 57, Joncryl® 59, Joncryl® 63 and Joncryl® 70, all from S.C. Johnson Co.; TruDot™ IJ-4655 and TruDot™ IJ-4680, both from MeadWestvaco Corp.; and Vancryl® 68S from Air Products and Chemicals, Inc.

Polymers useful in the inks of the invention include those referred to as condensation polymers, which are prepared by condensing a variety of different types of monomers to form polyesters, polyurethanes, polyamides, polyureas, polyethers, polycarbonates, polyacid anhydrides, and polymers comprising combinations of the above-mentioned types.

Specific examples of preferred polyesters include the water dispersible Eastman AQ® polyesters available from Eastman Chemical Co. Eastman AQ® 29, Eastman AQ® 38, and Eastman AQ® 55 are each composed of varying amounts of isophthalic acid, sodium sulfoisophthalic acid, diethylene glycol, and 1,4-cyclohexanedimethanol. Water dispersible polyurethanes are also preferred.

The addition polymers and the condensation polymers used in the inks of the invention are present in an amount necessary to give a normalized differential specular reflectance for the ink, $N\Delta R_S(X)$, of less than 1.25, but without affecting any of the desirable performance features of the ink. In particular, the amount of polymer used must be low enough such that the ink composition is jettable using an ink jet printhead. The necessary amount depends upon the particular polymer being used, as well as the identities and amounts of the other components in the ink composition. In a preferred embodiment, the polymer is used in an amount such that the ratio of polymer to pigment is at least about 0.5. In another preferred embodiment, the ratio of polymer to pigment is at least about 0.7.

The inks of the invention may include any other addenda which give a normalized differential specular reflectance for the ink, $N\Delta R_S(X)$, of less than 1.25. Examples of other addenda include non-volatile organic compounds which do not penetrate the surface of the recording element upon which the ink has been printed. In a preferred embodiment, glycol-containing oligomers are used.

Representative examples of water miscible humectants and water miscible organic co-solvents include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol, 1,2,6-hexanetriol, 2-ethyl-2-hydroxymethyl-1,3-propanediol, 1,5 pentanediol, 1,2-hexanediol, and thioglycol; (6) lower mono-alkyl ethers derived from alkylene glycols, such as the mono-methyl, mono-ethyl, mono-propyl and mono-butyl ethers of ethylene glycol, diethylene glycol, triethylene glycol, propylene glycol, and poly(ethylene glycol); (7) lower di-alkyl ethers derived from alkylene glycols, such as the di-methyl, di-ethyl, di-propyl and di-butyl ethers of ethylene glycol, diethylene glycol, triethylene glycol, propylene glycol, and poly(ethylene glycol); (8) nitrogen containing compounds, such as urea, 2-pyrrolidone, N-methyl-2-pyrrolidone, and 1,3-dimethyl-2-imidazolidinone; and (9) sulfur-containing compounds such as dimethyl sulfoxide, 2,2'-thiodiethanol, and tetramethylene sulfone.

Preferred humectants for the inks of the invention include diethylene glycol, glycerol, ethylene glycol butyl ether, and mixtures thereof. Humectants may be used in an amount of from about 5 to about 60 wt. %, preferably in an amount of from about 5 to about 30 wt. %.

Typically, the amount of aqueous carrier employed in the inks is in the range of approximately 70 to 98 wt. %, preferably approximately 90 to 98 wt. %, based on the total weight of the ink. In a preferred embodiment, the inks contain from about 5 to about 60 wt. % of one or more water miscible humectants and/or water miscible organic co-solvents, based on the total weight of the ink.

Other additives which may optionally be present in the inks of the invention include surfactants, penetrants, biocides, thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

Surfactants may be added to the ink to adjust the surface tension to an appropriate level. The surfactants may be anionic, cationic, amphoteric or nonionic and used at levels of 0.01 to 2 wt. %. Preferred surfactants include Surfynol® 465 (Air Products and Chemicals, Inc.) and Silwet® L-77 (Witco Corp.).

A biocide may be added to the inks employed in the invention to suppress the growth of microorganisms such as molds, fungi, etc. in aqueous inks. A preferred biocide for the inks employed in the present invention is Proxel® GXL (Avecia Corp.) at a final concentration of 0.0001–0.5 wt. %.

Particles may be added to the inks employed in the invention in order to minimize variations in gloss between imaged areas of different colors in a printed image, as described in U.S. patent application Ser. Nos. 10/032,931; 10/033,229; 10/034,281 and 10/034,285 filed on Dec. 28, 2001. Useful particles include silica, alumina, titanium dioxide, zircona, clay, calcium carbonate, barium sulfate, zinc oxide, polymeric particles, or mixtures thereof.

The pH of the inks employed in the invention may be adjusted by the addition of organic or inorganic acids or bases. Useful inks may have a preferred pH of from about 2 to 10. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

As used herein, the term "ink set" describes all the ink jet inks used in a printer to produce an image. The set can include inks of many colors; inks of many colors with different densities or hues; inks of one color only; or inks of one color with different densities or hues. The term means at least one ink, usually more than one ink, used to produce a color or a black and white image. For example, the ink set may consist of one ink such as a cyan ink; three inks such as cyan, magenta and yellow inks; or four inks such as cyan, magenta, yellow and black inks, as is well known in the art of ink jet printing.

Other examples include ink sets consisting of six, seven, eight or even more inks. Other inks that may be used in the ink sets of the present invention include black inks comprising black pigments such as C.I. Pigment Black 1, 7, 20, 31 or 32. A light cyan ink or a light magenta may also be used and are well known to those skilled in the art of ink jet printing. Such inks may contain the same or different pigments compared to those pigments used in the cyan or magenta inks, and the amount of pigment in the light inks is less than that in the cyan or magenta inks. For example, a cyan ink might contain Pigment Blue 15:3 at a concentration of 3 wt. %, and a light cyan ink might contain Pigment Blue 15:3 at a concentration of 0.5 wt. %.

Pigment-based ink sets useful in the present invention may include various other inks. Examples include an orange ink comprising an orange pigment such as C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; a green ink comprising a green pigment such as C.I. Pigment Green 1, 2, 4, 7, 8, 10, 36, 45; a violet ink comprising a violet pigment such as C.I. Pigment Violet 1, 2, 3, 5:1, 13, 19, 23, 25, 27, 29, 31, 32, 37, 39, 42, 44, 50; or a brown ink comprising a brown pigment such as C.I. Pigment Brown 1, 5, 22, 23, 25, 38, 41, 42.

Image-recording Elements

Any image-recording element having a gloss value of at least about 5 when measured at 60° may be used to determine $N\Delta R_S(X)$. However, the pigment-based ink sets of the present invention may be used in combination with any type of image-recording element suitable for use in ink jet printing.

Ink jet image-recording elements useful in the invention typically comprise an ink-receiving or image-forming layer coated on a support. The ink-receiving layer may be of the porous type having micropores which imbibe the ink via capillary action. Porous ink-receiving layers usually have at least 20 wt. % of particles and less than 50 wt. % of a polymeric binder. Useful particles include silica, alumina, titanium dioxide, clay, calcium carbonate, barium sulfate, zinc oxide, polymeric particles and mixtures thereof. Common polymeric binders are gelatin, poly(vinyl alcohol), poly(vinyl pyrrolidinone), poly(vinyl acetate), a cellulose derivative, or derivatives thereof. The ink-receiving layer may be of the nonporous type wherein the ink components must diffuse into the nonporous layer and cause it to swell. Nonporous ink-receiving layers consist primarily of common polymeric binders such as the ones described above.

Preferred ink jet image-recording elements having porous ink-receiving layers are Kodak Instant-Dry Photographic Glossy Media having Cat. No. 8103137, Epson Photoglossy Paper having Cat. No. SP 91001, and Kodak Instant-Dry Photographic Satin Media having Cat. No. 8648263. Also preferred are the image-recording elements described in U.S. Pat. Nos. 6,045,917; 5,605,750; 5,723,211; 5,789,070; EP 1 002 660; EP 813 978 A1; and U.S. patent application Ser. No. 09/944,547 of Sadasivan et al., filed Aug. 31, 2001; all of which the disclosures are incorporated herein by reference.

Another type of porous ink-receiving layer is made from a polymeric open-pore membrane as described in, for example, U.S. patent application Ser. No. 10/251,936 of Campbell et al., filed on Sep. 20, 2002, the disclosure of which is incorporated herein by reference.

The image-recording elements useful in the combination of the invention may consist of a variety of different kinds of supports, all of which are described in the references above. In a preferred embodiment, the support is paper or polyethylene-coated paper such as the type used in photographic paper.

The following example is provided to illustrate the invention.

EXAMPLE

Preparation of Pigment Dispersions

Cyan Pigment Dispersion

A mixture of 325 g of polymeric beads having mean diameter of 50 μm, 30.0 g of Pigment Blue 15:3 (Sun Chemical Corp.); 10.5 g of potassium oleoyl methyl taurate (KOMT) and 209.5 g of deionized water was prepared. These components were milled for 8 hours in a double walled vessel at room temperature using a high-energy media mill manufactured by Morehouse-Cowles Hochmeyer. The mixture was filtered through a 4–8 µm Buchner funnel to remove the polymeric beads, and the resulting filtrate diluted to give a Cyan Pigment Dispersion having a 10.0 wt. % final concentration of pigment. The median particle size of the pigment was 40 nm, as determined using a MICROTRAC II Ultrafine particle analyzer (UPA) manufactured by Leeds & Northrup. Proxel® GXL (Avecia Corp.) was added at an amount necessary to give 230 ppm concentration.

Magenta Pipment Dispersion

The Magenta Pigment Dispersion was prepared the same as the Cyan Pigment Dispersion except that Pigment Red 122 (Sun Chemical Corp.) was used instead of Pigment Blue 15:3. The final concentration of pigment was 11.6 wt. %, and the mean particle size was 15 nm.

Yellow Pigment Dispersion

The Yellow Pigment Dispersion was prepared the same as the Cyan Pigment Dispersion except that Pigment Yellow 155 (Clariant Corp.) was used instead of Pigment Blue 15:3. The final concentration of pigment was 10.0 wt. %, and the mean particle size was 10 nm.

Preparation of Ink Compositions

Cyan Ink C-1 of the Invention

Cyan Ink C-1 was prepared using the Cyan Pigment Dispersion described above to give 1.4 wt. % of pigment relative to the total weight of the ink. Other additives included diethylene glycol at 6.5 wt. %, glycerol at 3 wt. %, ethylene glycol butyl ether (Dowanol® EB from Dow Chemical Co.) at 2.5 wt. %, Surfynol® 465 (Air Products and Chemicals, Inc.) at 0.2 wt %, and Joncryl® 70, a styrene-acrylic copolymer available from S.C. Johnson Co., at 0.95 wt. % relative to the total weight of the ink. The ratio of copolymer to pigment was 0.7.

Magenta Ink M-1 of the Invention

Magenta Ink M-1 was prepared the same as Cyan Ink C-1 except that the Magenta Pigment Dispersion was used at 2.1 wt. % instead of the Cyan Pigment Dispersion, diethylene glycol was used at 4.5 wt. %, and Joncryl® 70 was used at 1.5 wt. %. The ratio of copolymer to pigment was 0.7.

Yellow Ink Y-1 of the Invention

Yellow Ink Y-1 was prepared the same as Magenta Ink M-1 except that the Yellow Pigment Dispersion was used instead of the Magenta Pigment Dispersion.

Cyan Ink C-2 of the Invention

Cyan Ink C-2 was prepared the same as Cyan Ink C-1 except that TruDot™ IJ-4655, a styrene-acrylic copolymer available from MeadWestvaco Corp., was used instead of Joncryl® 70.

Magenta Ink M-2 of the Invention

Magenta Ink M-2 was prepared the same as Magenta Ink M-1 except that TruDot™ IJ-4655 was used instead of Joncryl® 70.

Yellow Ink Y-2 of the Invention

Yellow Ink Y-2 was prepared the same as Yellow Ink Y-1 except that TruDot™ IJ-4655 was used instead of Joncryl® 70.

Cyan Ink C-3 of the Invention

Cyan Ink C-3 was prepared using the Cyan Pigment Dispersion described above to give 1.4 wt. % of pigment relative to the total weight of the ink. Other additives included diethylene glycol at 11.0 wt. %, glycerol at 6.0 wt. %, ethylene glycol butyl ether at 2.5 wt. %, Silwet® L-77 (Witco Corp.) at 1.0 wt. %, and Eastman AQ® 55, a polyester available from Eastman Chemical Co., to give 0.95 wt. % of polyester relative to the total weight of the ink. The ratio of copolymer to pigment was 0.7.

Magenta Ink M-3 of the Invention

Magenta Ink M-3 was prepared the same as Cyan Ink C-3 except that the Magenta Pigment Dispersion was used at 2.1 wt. % instead of the Cyan Pigment Dispersion, diethylene glycol was used at 9.0 wt. % and Eastman AQ® 55 was used at 1.5 wt. %. The ratio of copolymer to pigment was 0.7.

Yellow Ink Y-3 of the Invention

Yellow Ink Y-3 was prepared the same as Magenta Ink M-3 except that the Yellow Pigment Dispersion was used instead of the Magenta Pigment Dispersion.

Cyan Ink C-4 of the Invention

Cyan Ink C-4 was prepared using the Cyan Pigment Dispersion described above to give 1.4 wt. % of pigment relative to the total weight of the ink. Other additives included diethylene glycol at 12.0 wt. %, Surfynol® 465 at 0.2 wt. % and TruDot™ IJ-4655 at 1.2 wt. %. The ratio of copolymer to pigment was 0.9.

Magenta Ink M-4 of the Invention

Magenta Ink M-4 was prepared using the Magenta Pigment Dispersion described above at 2.1 wt. % of pigment relative to the total weight of the ink. Other additives included diethylene glycol at 10.0 wt. %, Surfynol® 465 at 0.2 wt. % and TruDot™ IJ-4655 at 1.96 wt. %. The ratio of copolymer to pigment was 0.9.

Yellow Ink Y-4 of the Invention

Yellow Ink Y-4 was prepared the same as Magenta Ink M-4 except that the Yellow Pigment Dispersion was used instead of the Magenta Pigment Dispersion.

Comparative Cyan Ink CC-1 (No Polymer Addenda)

Comparative Cyan Ink CC-1 was prepared using the Cyan Pigment Dispersion described above to give 1.4 wt. % of pigment relative to the total weight of the ink. Other additives included diethylene glycol at 13.5 wt. %, glycerol at 6.0 wt. %, ethylene glycol butyl ether at 2.5 wt. % and Surfynol® 465 at 0.2 wt. %.

Comparative Magenta Ink CM-1 (No Polymer Addenda)

Comparative Magenta Ink CM-1 was prepared using the Magenta Pigment Dispersion described above to give 2.1 wt. % of pigment relative to the total weight of the ink. Other additives included diethylene glycol at 12.0 wt. %, glycerol at 6.0 wt. %, ethylene glycol butyl ether at 2.5 wt. % and Surfynol® 465 at 0.2wt. %.

Comparative Yellow Ink CY-1 (No Polymer Addenda)

Comparative Yellow Ink CY-1 was prepared the same as Comparative Magenta Ink CM-1 except that the Yellow Pigment Dispersion was used instead of the Magenta Pigment Dispersion.

Comparative Cyan Ink CC-2 (Low Ratio of Copolymer to Pigment)

Comparative Cyan Ink CC-2 was prepared using the Cyan Pigment Dispersion described above to give 1.4 wt. % of pigment relative to the total weight of the ink. Other additives included diethylene glycol at 17.0 wt. %, Surfynol® 465 at 0.2 wt. % and TruDot™ IJ-4655 at 0.4 wt. %. The ratio of copolymer to pigment was 0.3.

Comparative Magenta Ink CM-2 (Low Ratio of Copolymer to Pigment)

Comparative Magenta Ink CM-2 was prepared using the Magenta Pigment Dispersion described above to give 2.1 wt. % of pigment relative to the total weight of the ink. Other additives included diethylene glycol at 15.0 wt. %, Surfynol® 465 at 0.2 wt. % and TruDot™ IJ-4655 at 0.65 wt. %. The ratio of copolymer to pigment was 0.3.

Comparative Yellow Ink CY-2 (Low Ratio of Copolymer to Pigment)

Comparative Yellow Ink CY-2 was prepared the same as Comparative Magenta Ink CM-2 except that the Yellow Pigment Dispersion was used instead of the Magenta Pigment Dispersion.

Comparative Cyan Ink CC-3 (Low Ratio of Copolymer to Pigment)

A polyurethane copolymer dispersion consisting of 25 wt. % of a polyurethane copolymer of neopentylglycol, bis (hydroxymethyl)propionic acid and bis (cyclohexylmethylene)diisocyanate at 1:2:3 mole ratio was prepared according to the procedure described in U.S. Pat. No. 6,426,167, the disclosure of which is incorporated herein by reference. This copolymer is referred to as Polyurethane NBB.

Comparative Cyan Ink CC-3 was prepared using the Cyan Pigment Dispersion described above to give 1.4 wt. % of pigment relative to the total weight of the ink. Other additives included diethylene glycol at 6.5 wt. %, glycerol at 3 wt. %, ethylene glycol butyl ether at 2.5 wt. %, Surfynol 465 at 0.2 wt. % and the polyurethane dispersion described above to give 0.7 wt. % of Polyurethane NBB relative to the total weight of the ink. The ratio of copolymer to pigment was 0.5.

Comparative Magenta Ink CM-3 (Low Ratio of Copolymer to Pigment)

Comparative Magenta Ink CM-3 was prepared the same as Comparative Cyan Ink CC-3 except that the Magenta Pigment Dispersion was used at 2.1 wt. % instead of the Cyan Pigment Dispersion, diethylene glycol was used at 4.5 wt. % and Polyurethane NBB was used at 1.0 wt. %. The ratio of copolymer to pigment was 0.5.

Comparative Yellow Ink CY-3 (Low Ratio of Copolymer to Pigment)

Comparative Yellow Ink CY-3 was prepared the same as Comparative Magenta Ink CM-3 except that the Yellow Pigment Dispersion was used instead of the Magenta Pigment Dispersion.

Comparative Cyan Ink CC-4 (Low Ratio of Copolymer to Pigment)

Comparative Cyan Ink CC-4 was prepared the same as Comparative Cyan Ink CC-3 except that Joncryl® 70 was used instead of Polyurethane NBB.

Comparative Magenta Ink CM-4 (Low Ratio of Copolymer to Pigment)

Comparative Magenta Ink CM-4 was prepared the same as Comparative Magenta Ink CM-3 except that Joncryl® 70 was used instead of Polyurethane NBB.

Comparative Yellow Ink CY-4 (Low Ratio of Copolymer to Pigment)

Comparative Yellow Ink CY-4 was prepared the same as Comparative Magenta Ink CM-4 except that the Yellow Pigment Dispersion was used instead of the Magenta Pigment Dispersion.

Comparative Cyan Ink CC-5 (Low Ratio of Copolymer to Pigment)

Comparative Cyan Ink CC-5 was prepared the same as Comparative Cyan Ink CC-3 except that TruDot™ IJ-4655 was used instead of Polyurethane NBB.

Comparative Magenta Ink CM-5 (Low Ratio of Copolymer to Pigment)

Comparative Magenta Ink CM-5 was prepared the same as Comparative Magenta Ink CM-3 except that TruDot™ IJ-4655 was used instead of Polyurethane NBB.

Comparative Yellow Ink CY-5 (Low Ratio of Copolymer to Pigment)

Comparative Yellow Ink CY-5 was prepared the same as Comparative Magenta Ink CM-5 except that the Yellow Pigment Dispersion was used instead of the Magenta Pigment Dispersion.

Comparative Cyan Ink CC-6 (Low Ratio of Copolymer to Pigment)

Comparative Cyan Ink CC-6 was prepared using the Cyan Pigment Dispersion described above to give 1.4 wt. % of pigment relative to the total weight of the ink. Other additives included diethylene glycol at 9.0 wt. %, glycerol at 6.0 wt. %, ethylene glycol butyl ether at 2.5 wt. %, Silwet® L-77 at 1.0 wt. % and Eastman AQ® 55 at 0.7 wt. % of polyester relative to the total weight of the ink. The ratio of copolymer to pigment was 0.5.

Comparative Magenta Ink CM-6 (Low Ratio of Copolymer to Pigment)

Comparative Magenta Ink CM-6 was prepared the same as Comparative Cyan Ink CC-6 except that the Magenta Pigment Dispersion was used at 2.1 wt. % instead of the Cyan Pigment Dispersion, diethylene glycol was used at 7.0 wt. % and Eastman AQ® 55 was used at 1.0 wt. %. The ratio of copolymer to pigment was 0.5.

Comparative Yellow Ink CY-6 (Low Ratio of Copolymer to Pigment)

Comparative Yellow Ink CY-6 was prepared the same as Comparative Magenta Ink CM-6 except that the Yellow Pigment Dispersion was used instead of the Magenta Pigment Dispersion.

Comparative Cyan Ink CC-7 (Low Ratio of Copolymer to Pigment)

Comparative Cyan Ink CC-7 was prepared using the Cyan Pigment Dispersion described above to give 1.4 wt. % of pigment relative to the total weight of the ink. Other additives included diethylene glycol at 3.5 wt. %, glycerol at 2.0 wt. %, ethylene glycol butyl ether at 2.5 wt. %, Surfynol® 465 at 0.2 wt. % and TruDot™ IJ-4680, a styrene-acrylic copolymer available from MeadWestvaco Corp., at 0.95 wt. %. The ratio of copolymer to pigment was 0.7.

Comparative Magenta Ink CM-7 (Low Ratio of Copolymer to Pigment)

Comparative Magenta Ink CM-7 was prepared using the Magenta Pigment Dispersion described above at 2.1 wt. % of pigment relative to the total weight of the ink. Other additives included diethylene glycol at 3.0 wt. %, glycerol at 1.5 wt. %, ethylene glycol butyl ether at 2.5 wt. %, Surfynol® 465 at 0.2 wt. % and TruDot™ IJ-4680 at 1.5 wt. %. The ratio of copolymer to pigment was 0.7.

Comparative Yellow Ink CY-7 (Low Ratio of Copolymer to Pigment)

Comparative Yellow Ink CY-7 was prepared the same as Comparative Magenta Ink CM-7 except that the Yellow Pigment Dispersion was used instead of the Magenta Pigment Dispersion.

Ink Sets

The above inks were evaluated as tri-color ink sets each consisting of cyan, magenta and yellow inks. In addition, the following ink sets were evaluated as comparative examples. All of the ink sets used in the Example are described in Table 1.

Comparative Ink Set CIS-1

Comparative Ink Set CIS-1 consisted of cyan, magenta and yellow pigment-based inks available as Encad Graphic Outdoor™ (GO) Inks from Encad, Inc. The catalogue numbers for the cyan, magenta and yellow inks were 210504-00, 210505-00 and 210506-00, respectively.

Comparative Ink Set CIS-2

Comparative Ink Set CIS-2 consisted of cyan, magenta and yellow pigment-based inks available as Epson Stylus Photo 2000P from Epson, Inc. The catalogue number for the tri-color cartridge was T106201.

Comparative Ink Set CIS-3

Comparative Ink Set CIS-3 consisted of cyan, magenta and yellow pigment-based inks available as Epson Stylus C80 from Epson, Inc. The catalogue numbers for the cyan, magenta and yellow inks were T032220, T032320 and T032420, respectively.

Comparative Ink Set CIS-4

Comparative Ink Set CIS-4 consisted of cyan, magenta and yellow pigment-based inks available as Hewlett-Packard 5000 UV Inks from Hewlett-Packard Co. The catalogue numbers for the cyan, magenta and yellow inks were C4941A, C4942A and C4943A, respectively.

TABLE 1

| Ink Set | Cyan Ink | Magenta Ink | Yellow Ink |
|---|---|---|---|
| IS-1 | C-1 | M-1 | Y-1 |
| IS-2 | C-2 | M-2 | Y-2 |
| IS-3 | C-3 | M-3 | Y-3 |
| IS-4 | C-4 | M-4 | Y-4 |
| CIS-1 | Encad GO | Encad GO | Encad GO |
| CIS-2 | Epson 2000P | Epson 2000P | Epson 2000P |
| CIS-3 | Epson C80 | Epson C80 | Epson C80 |
| CIS-4 | HP 5000 UV | HP 5000 UV | HP 5000 UV |
| CIS-5 | CC-1 | CM-1 | CY-1 |
| CIS-6 | CC-2 | CM-2 | CY-2 |
| CIS-7 | CC-3 | CM-3 | CY-3 |
| CIS-8 | CC-4 | CM-4 | CY-4 |
| CIS-9 | CC-5 | CM-5 | CY-5 |
| CIS-10 | CC-6 | CM-6 | CY-6 |
| CIS-11 | CC-7 | CM-7 | CY-7 |

Printing

Ink sets IS-1 through IS-4, and CIS-5 through CIS-11 were printed using a Lexmark Z51 ink jet printer and an empty ink cartridge having catalogue number 12A1990. CIS-2 was printed using an Epson Stylus Photo 2000P printer, CIS-3 was printed using an Epson Stylus C80 printer, and CIS-4 was printed using a Hewlett-Packard DesignJet 5000 printer. In all cases, printing was carried out without color management, such that each patch was printed with a single ink.

The test image consisted of eleven density patches, each approximately 7 by 7 mm in size, and created using Adobe® PhotoShop® v4.0 software (Adobe Systems) in the CMYK mode. The densities of the patches increased incrementally to give 0, 10, 20, 30, 40, 50, 60, 70, 80, 90 and 100% ink laydown such that the patch printed at 100% exhibited a density of 1.5 to 2.0. The ink sets were printed on Kodak Instant-Dry Photographic Glossy Media having catalogue number 8103137. The printed test images were allowed to dry for 24 hours at ambient temperature and humidity.

Evaluation of Test Images

The specular reflectance measurements were obtained using a PR-705 spectroradiometer, a linear photodiode array spectral measurement device available from Photo Research Spectroscan. The light source was an Oriel fiber-optic illuminator 77501 having a correlated color temperature of about 6700 K and was projected using a liquid light guide at $\Theta_i=45°$. The aperture of the detector was 0.5° by 1.50°.

For each patch, the reflected light intensities in watts/sr/m$^2$ were measured at 10 nm increments over the wavelength range of 390 to 770 nm. A reference specular reflectance was obtained at $\Theta_i=45°$ and $\Theta_r=-45°$ for a calibrated (NIST) piece of polished black glass. Each reflected light intensity value was divided by the reference reflectance to give the corresponding specular reflectance values. $R_{Smax}(Xn)$, $R_{Smin}(Xn)$ and $R_{Smean}(Xn)$ were determined for each patch, and $N\Delta R_S(X1)$ through $N\Delta R_S(X11)$ determined according to Equation 2. The normalized differential specular reflectance for the ink, $N\Delta R_S(X)$, was determined according to Equation 1. The results are shown in Table 2. $N\Delta R_S(X)$ values less than 1.25 are desirable.

TABLE 2

| Ink Set | Polymer Addenda | Polymer:Pigment Ratio | $N\Delta R_S$ (C) | $N\Delta R_S$ (M) | $N\Delta R_S$ (Y) |
|---|---|---|---|---|---|
| IS-1 | Joncryl® 70 | 0.7 | 1.15 | 0.46 | 0.28 |
| IS-2 | TruDot™ IJ-4655 | 0.7 | 1.21 | 0.49 | 0.26 |
| IS-3 | Eastman AQ® 55 | 0.7 | 1.23 | 0.49 | 0.23 |
| IS-4 | TruDot™ IJ-4655 | 0.9 | 1.12 | 0.48 | 0.22 |
| CIS-1 | unknown | N/A | 1.30 | 0.42 | 0.43 |
| CIS-2 | unknown | N/A | 1.58 | 0.62 | 0.38 |
| CIS-3 | unknown | N/A | 1.42 | 0.56 | 0.54 |
| CIS-4 | unknown | N/A | 1.41 | 0.53 | 0.36 |
| CIS-5 | none | N/A | 1.55 | 0.66 | 0.53 |
| CIS-6 | TruDot™ IJ-4655 | 0.3 | 1.39 | 0.63 | 0.33 |
| CIS-7 | Polyurethane NBB | 0.5 | 1.36 | 0.59 | 0.42 |
| CIS-8 | Joncryl® 70 | 0.5 | 1.26 | 0.51 | 0.26 |
| CIS-9 | TruDot™ IJ-4655 | 0.5 | 1.31 | 0.52 | 0.28 |
| CIS-10 | Eastman AQ® 55 | 0.5 | 1.34 | 0.56 | 0.23 |
| CIS-11 | TruDot™ IJ-4680 | 0.7 | 1.28 | 0.50 | 0.34 |

The results in Table 2 show that the ink sets of the present invention consist of inks wherein the maximum normalized differential specular reflectance for each of the inks, $N\Delta R_S(X)$, is less than 1.25. The comparative ink sets consist of inks having $N\Delta R_S(X)$ greater than 1.25. Commercially available ink sets CIS-1 through CIS-4 consist of inks having $N\Delta R_S(X)$ of at least 1.30. The chromatic gloss observed for each of the ink sets of the present invention is less objectionable than the chromatic gloss observed for those of the comparative ink sets.

The present description will be directed in particular to elements forming part of, or cooperating more directly with, apparatus and methods in accordance with the present invention. It is to be understood that elements not specifically shown or described may take various forms well known to those skilled in the art.

What is claimed is:

1. A pigment-based ink set for ink jet printing, the ink set comprising at least one pigment-based ink; wherein the normalized differential specular reflectance for each ink in the set, $N\Delta R_S(X)$, is less than 1.25 when calculated according to Equation 1:

$$N\Delta R_S(X) = [N\Delta R_S(Xn)]_{max} \qquad \text{Equation 1}$$

where X represents the ink, n is an integer associated with each density patch printed on an image-recording element as part of a test image, and $[N\Delta R_S(Xn)]_{max}$ is the maximum value of the $[N\Delta R_S(Xn)]$ values that are calculated for the density patches printed using ink X; wherein the image-recording element has a gloss value of at least about 5 when measured at 60°; wherein the test image for ink X consists of a series of at least ten density patches printed such that the ink laydown of the patches increases incrementally, from no ink laydown to a maximum level generating a density of at least about 1.5; and wherein the normalized differential specular reflectance value for each patch, $N\Delta R_S(Xn)$, is determined according to Equation 2:

$$N\Delta R_S(Xn) = \frac{[R_{Smax}(Xn) - R_{Smin}(Xn)]}{R_{Smean}(Xn)} \qquad \text{Equation 2}$$

where $R_{Smax}(Xn)$ is the maximum specular reflectance over the visible spectral region between 390 nm and 720 nm for patch Xn, $R_{Smin}(Xn)$ is the minimum specular reflectance over the visible spectral region between 390 nm and 720 nm for patch Xn, and $R_{Smean}(Xn)$ is the average specular reflectance over the visible spectral region between 390 nm and 720 nm for patch Xn.

2. The pigment-based ink set of claim 1 wherein said pigment-based ink is a cyan ink comprising a cyan pigment; a magenta ink comprising a magenta pigment; or a yellow ink comprising a yellow pigment.

3. The pigment-based ink set according to claim 2, wherein said cyan pigment comprises a metal phthalocyanine pigment.

4. The pigment-based ink set according to claim 2, wherein said cyan pigment comprises a pigment selected from the group consisting of Pigment Blue 15:2, Pigment Blue 15:3, Pigment Blue 15:4, Pigment Blue 60, and a bis(phthalocyanylalumino)tetraphenyldisiloxane.

5. The pigment-based ink set according to claim 2, wherein said magenta pigment comprises a quinacridone pigment.

6. The pigment-based ink set according to claim 2, wherein said magenta pigment comprises a pigment selected from the group consisting of Pigment Red 122, Pigment Red 57:1, Pigment Red 123, Pigment Red 168, Pigment Red 184, Pigment Red 202 and Pigment Red 207.

7. The pigment-based ink set according to claim 2, wherein said yellow pigment comprises a pigment selected from the group consisting of Pigment Yellow 155, Pigment Yellow 74, Pigment Yellow 128, Pigment Yellow 13 and Pigment Yellow 93.

8. The pigment-based ink set according to claim 1, wherein said pigment-based ink comprises an inorganic pigment.

9. The pigment-based ink set according to claim 1, wherein said pigment-based ink comprises a pigment having a median particle size of less than about 0.3 µm.

10. The pigment-based ink set according to claim 1, wherein said pigment-based ink comprises a pigment having a median particle size of less than about 0.15 µm.

11. The pigment-based ink set according to claim 2, wherein said ink set further comprises a black ink comprising a black pigment.

12. The pigment-based ink set according to claim 11, wherein said black pigment is carbon black.

13. The pigment-based ink set according to claim 2, wherein said ink set further comprises a light cyan ink comprising a cyan pigment or a light magenta ink comprising a magenta pigment.

14. The pigment-based ink set according to claim 2, wherein said ink set further comprises an orange ink comprising an orange pigment, a green ink comprising a green pigment, a violet ink comprising a violet pigment or a brown ink comprising a brown pigment.

15. The pigment-based ink set according to claim 1, wherein said pigment-based ink comprises particles.

16. The pigment-based ink set according to claim 1, wherein said pigment-based ink comprises silica, alumina, titanium dioxide, zircona, clay, calcium carbonate, barium sulfate, zinc oxide, polymeric particles, or mixtures thereof.

17. The pigment-based ink set according to claim 2, wherein said normalized differential specular reflectance for each ink in the set, $N\Delta R_S(X)$, is less than 1.15 when calculated according to Equation 1.

18. The pigment-based ink set according to claim 1, wherein said at least one pigment-based ink comprises a water soluble polymer, a water reducible polymer, a water dispersible polymer, or mixtures thereof; wherein said water soluble polymer, said water reducible polymer, said water dispersible polymer, or said mixtures thereof is present in an amount necessary to give a normalized differential specular reflectance for said at least one pigment-based ink, $N\Delta R_S(X)$, of less than 1.25.

19. The pigment-based ink set according to claim 1, wherein said at least one pigment-based ink comprises an addition polymer or a condensation polymer; wherein said addition polymer or said condensation polymer is present in an amount necessary to give a normalized differential specular reflectance for said at least one pigment-based ink, $N\Delta R_S(X)$, of less than 1.25.

20. The pigment-based ink set according to claim 1, wherein said at least one pigment-based ink comprises an addition polymer prepared from acrylic and/or styrenic monomers, a polyester, or a polyurethane; wherein said addition polymer, said polyester, or said polyurethane is present in an amount necessary to give a normalized differential specular reflectance for said at least one pigment-based ink, $N\Delta R_S(X)$, of less than 1.25.

21. The pigment-based ink set according to claim 20, wherein said acrylic monomer comprises a derivative of acrylic acid, an acrylate ester, an acrylamide, or an unsaturated anhydride or unsaturated imide monomer; wherein said unsaturated anhydride or unsaturated imide monomer may be completely or partially hydrolyzed after polymerization to form the corresponding carboxylic acid or amide functionality.

22. The pigment-based ink set according to claim 20, wherein said styrenic monomer comprises a derivative of styrene, an α-alkylstyrene, a trans-β-alkylstyrene, an alkylstyrene, an alkoxystyrene, a halogenated styrene, or a vinyl naphthalene.

23. The pigment-based ink set according to claim 20, wherein said polyester is derived from isophthalic acid, sodium sulfoisophthalic acid, diethylene glycol, and 1,4-cyclohexanedimethanol.

24. The pigment-based ink set according to claim 20, wherein said polyurethane is water dispersible.

25. The pigment-based ink set according to claim 1, wherein said pigment-based ink further comprises one or more non-volatile organic compounds which do not penetrate the surface of the recording element upon which said at least one pigment-base ink has been printed; wherein said one or more non-volatile organic compounds is present in an amount necessary to give a normalized differential specular reflectance for said ink, $N\Delta R_S(X)$, of less than 1.25.

26. The pigment-based ink set according to claim 25, wherein said non-volatile organic compound is a glycol-containing oligomer.

27. The pigment-based ink set according to claim 19, wherein the pigment-based ink further comprises a pigment, and wherein the ratio of said addition polymer or said condensation polymer to said pigment is at least about 0.5.

28. The pigment-based ink set according to claim 19, wherein the pigment-based ink further comprises a pigment, and wherein the ratio of said addition polymer or said condensation polymer to said pigment is at least about 0.7.

29. A method of selecting a pigment-based ink set for ink jet printing comprising:

A) providing at least one pigment-based ink;

B) printing a test image of the at least one pigment-based ink on an image-recording element having a gloss value of at least about 5 when measured at 60°; wherein the test image consists of a series of at least ten density patches printed such that the ink laydown of the patches increases incrementally, from no ink laydown to a maximum level generating a density of at least about 1.5;

C) calculating the normalized differential specular reflectance value for each of the at least ten density patches, $N\Delta R_S(Xn)$, according to Equation 2:

$$N\Delta R_S(Xn) = \frac{[R_{Smax}(Xn) - R_{Smin}(Xn)]}{R_{Smean}(Xn)} \quad \text{Equation 2}$$

where X represents the at least one pigment-based ink, n is an integer associated with each density patch printed as part of the test image, $R_{Smax}(Xn)$ is the maximum specular reflectance over the visible spectral region between 390 nm and 720 nm for patch Xn, $R_{Smin}(Xn)$ is the minimum specular reflectance over the visible spectral region between 390 nm and 720 nm for patch Xn, and $R_{Smean}(Xn)$ is the average specular reflectance over the visible spectral region between 390 nm and 720 nm for patch Xn;

D) calculating the normalized differential specular reflectance for the at least one pigment-based ink, $N\Delta R_S(X)$, according to Equation 1:

$$N\Delta R_S(X) = [N\Delta R_S(Xn)]_{max} \quad \text{Equation 1}$$

where $[N\Delta R_S(Xn)]_{max}$ is the maximum value of the $N\Delta R_S(Xn)$ values that are calculated for the density patches using ink X; and E) selecting said pigment-based ink set such that $N\Delta R_S(X)$ for the at least one pigment-based ink is less than 1.25.

30. An ink jet printing method comprising the steps of:

A) providing an ink jet printer that is responsive to digital data signals;

B) loading the printer with a first image-recording element;

C) loading the printer with a pigment-based ink jet ink set comprising at least one pigment-based ink, wherein the normalized differential specular reflectance for each ink in the set, $N\Delta R_S(X)$, is less than 1.25 when calculated according to Equation 1:

$$N\Delta R_S(X) = [N\Delta R_S(Xn)]_{max} \quad \text{Equation 1}$$

where X represents the ink, n is an integer associated with each density patch printed on a second image-recording element as part of a test image, and $[N\Delta R_S(Xn)]_{max}$ is the maximum value of the $[N\Delta R_S(Xn)]$ values that are calculated for the density patches printed using ink X; wherein the second image-recording element has a gloss value of at least about 5 when measured at 60°; wherein said test image for ink X consists of a series of at least ten density patches printed such that the ink laydown of the patches increases incrementally, from no ink laydown to a maximum level generating a density of at least about 1.5; and wherein the normalized differential specular reflectance value for each patch, $N\Delta R_S(Xn)$, is determined according to:

$$N\Delta R_S(Xn) = \frac{[R_{Smax}(Xn) - R_{Smin}(Xn)]}{R_{Smean}(Xn)} \quad \text{Equation 2}$$

where $R_{Smax}(Xn)$ is the maximum specular reflectance over the visible spectral region between 390 nm and 720 nm for patch Xn, $R_{Smin}(Xn)$ is the minimum specular reflectance over the visible spectral region between 390 nm and 720 nm for patch Xn, and $R_{Smean}(Xn)$ is the average specular reflectance over the visible spectral region between 390 nm and 720 nm for patch Xn; and D) printing on the first image-recording element, using the pigment-based ink jet ink set in response to the digital data signals.

* * * * *